United States Patent
MacInnis et al.

(10) Patent No.: US 7,227,587 B2
(45) Date of Patent: Jun. 5, 2007

(54) SYSTEM AND METHOD FOR THREE DIMENSIONAL COMB FILTERING

(75) Inventors: Alexander G. MacInnis, Los Altos, CA (US); Sheng Zhong, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 505 days.

(21) Appl. No.: 10/794,034

(22) Filed: Mar. 5, 2004

(65) Prior Publication Data
US 2004/0174464 A1  Sep. 9, 2004

Related U.S. Application Data

(60) Provisional application No. 60/452,273, filed on Mar. 5, 2003.

(51) Int. Cl.
H04N 9/78 (2006.01)
H04N 9/77 (2006.01)

(52) U.S. Cl. .................. 348/667; 348/664; 348/665; 348/609; 348/712; 348/713

(58) Field of Classification Search ............... 348/667, 348/609, 610, 665, 663, 666, 669, 664, 712, 348/713, 624; 382/260, 261, 162, 167
See application file for complete search history.

(56) References Cited

U.S. PATENT DOCUMENTS

| | | | | |
|---|---|---|---|---|
| 4,651,196 A | * | 3/1987 | Harwood et al. | 348/667 |
| 5,027,194 A | * | 6/1991 | Scheffler | 348/609 |
| 5,305,120 A | * | 4/1994 | Faroudja | 348/624 |
| 5,448,305 A | * | 9/1995 | Hagino | 348/665 |
| 5,483,294 A | * | 1/1996 | Kays | 348/609 |
| 5,517,255 A | * | 5/1996 | Gai et al. | 348/663 |
| 5,583,579 A | * | 12/1996 | Shim | 348/668 |
| 5,585,861 A | * | 12/1996 | Taniguchi et al. | 348/669 |
| 5,663,771 A | * | 9/1997 | Raby | 348/663 |
| 5,786,872 A | * | 7/1998 | Miyazaki et al. | 348/669 |

(Continued)

OTHER PUBLICATIONS

Shin-etsu Ito; "A study of Digital Y/C Separation in NTSC or PAL Color Television;" IEEE 1994; pp. 963-968.

(Continued)

*Primary Examiner*—David Ometz
*Assistant Examiner*—Jean W. Désir
(74) *Attorney, Agent, or Firm*—McAndrews, Held & Malloy, Ltd.

(57) ABSTRACT

A system and method for determining whether to process a signal using three-dimensional comb filtering. Various aspects of the present invention may comprise method steps and system components that generate an inter-frame chroma signal. Various aspects may generate a filtered inter-frame chroma signal by removing a band of frequency components from the inter-frame chroma signal that generally corresponds to chroma signal components. Various aspects may analyze the filtered inter-frame chroma signal to determine whether three-dimensional comb filtering may be appropriate. Various aspects may comprise method steps and components that generate inter-frame and intra-frame luma signals. Various aspects may generate filtered inter-frame and intra-frame luma signals by removing frequency components from the inter-frame and intra-frame luma signals, respectively, that fall outside a frequency band near the chroma sub-carrier frequency. Various aspects may analyze the filtered inter-frame and intra-frame luma signals to determine whether three-dimensional comb filtering may be appropriate.

35 Claims, 7 Drawing Sheets

U.S. PATENT DOCUMENTS

| | | | |
|---|---|---|---|
| 5,870,153 A * | 2/1999 | Murray et al. | 348/667 |
| 6,175,389 B1 * | 1/2001 | Felts et al. | 348/663 |
| 6,278,495 B1 * | 8/2001 | Lowe et al. | 348/665 |
| 6,384,873 B1 * | 5/2002 | Rumreich et al. | 348/666 |
| 6,774,954 B1 * | 8/2004 | Lee | 348/665 |
| 6,809,778 B2 * | 10/2004 | Shibutani et al. | 348/667 |
| 6,914,638 B2 * | 7/2005 | Tsui | 348/663 |
| 6,950,149 B1 * | 9/2005 | Goseki | 348/667 |
| 6,999,130 B2 * | 2/2006 | Tanigawa | 348/663 |
| 7,092,038 B2 * | 8/2006 | Shih et al. | 348/663 |

OTHER PUBLICATIONS

Daeyun Shim, Junmo Jung, Jongsang Yim, Taehyung Lee, Jungsang Lee, Yunbok Shin, Y.C. Jeung, J.H. Lee; "An Advanced 2 Dimensional Y/C Separation and Y/C Processing VLSI for NTSC Composite Video Signal;" IEEE 1992; pp. 256-257.

Shin-etsu Ito, Robert Lowlor, Norio Ebihara; "Development of a Crosstalk Measurement Type Three-dimensional Digital Color Decoder;" IEEE 1993; pp. 63-70.

* cited by examiner

SYSTEM AND METHOD FOR THREE DIMENSIONAL COMB FILTERING

CROSS-REFERENCE TO RELATED APPLICATIONS/INCORPORATION BY REFERENCE

This patent application claims the benefit of U.S. Provisional Application No. 60/452,273, filed Mar. 5, 2003, the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Various signal processing systems may utilize comb filtering, which generally refers to signal processing that separates signals with spectra that are interleaved in the frequency domain in a pattern that may resemble teeth of a comb. For example, video-processing systems may utilize comb filtering to separate chroma information from luma information in composite video signals.

Various systems and methods exist for comb filtering, including two-dimensional and three-dimensional comb filtering. Two-dimensional comb filtering may involve, for example, performing comb filtering on a current video signal and another video signal from the same video field as the current video signal. Two-dimensional comb filtering may process a current video signal from a current video line with a second signal from a video line in the same video field that is vertically adjacent to the current video line and that corresponds horizontally to the current video signal. Three-dimensional comb filtering may include, for example, performing comb filtering on a current video signal from a current video frame and another video signal from a different video frame that corresponds spatially to the current video signal. In the following discussion, "three-dimensional comb filtering" generally refers to comb filtering using at least two signals that are not from the same video field.

In video processing systems that utilize two-dimensional and three-dimensional comb filtering, various phenomena in the processed video signals may cause one of two-dimensional filtering and three-dimensional filtering to be superior to the other. For example, when performing three-dimensional comb filtering on a current signal, significant motion between the current frame and the previous frame (or other different frame) may result in a poor frame comb. In such a situation, it may be preferable for the video processing system to at least temporarily utilize two-dimensional comb filtering instead of three-dimensional comb filtering in processing the current signal.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and method are provided for determining whether to process a current signal using three-dimensional comb filtering. Various aspects of the present invention may comprise method steps and system components that generate an inter-frame chroma signal by frame combing the current signal and a corresponding signal from a previous video frame. Various aspects may generate a filtered inter-frame chroma signal by substantially removing a frequency band from the inter-frame chroma signal that generally corresponds to the chroma frequency band. Various aspects may analyze the filtered inter-frame chroma signal to determine whether three-dimensional comb filtering may be appropriate for the current signal. For example, and without limitation, various aspects may compare the filtered inter-frame chroma signal to one or more thresholds to determine whether three-dimensional comb filtering the current signal may be appropriate.

Various aspects of the present invention may comprise method steps and system components that generate an inter-frame luma signal by frame combing the current signal and a corresponding signal from a previous (or different) frame. Various aspects may generate a filtered inter-frame luma signal by substantially removing frequency components from the inter-frame luma signal that, for example, are not within a portion of the chroma frequency band that includes the chroma sub-carrier frequency. Various aspects may analyze the filtered inter-frame luma signal to determine whether three-dimensional comb filtering may be appropriate. For example, and without limitation, various aspects may compare the filtered inter-frame luma signal to one or more thresholds to determine whether three-dimensional comb filtering the current signal may be appropriate.

Various aspects of the present invention may further comprise method steps and system components that generate an intra-frame luma signal by frame combing the current signal and a corresponding signal from, for example, another line of the same field as the current signal. Various aspects may generate a filtered intra-frame luma signal by substantially removing frequency components from the intra-frame luma signal that, for example, are not within a portion of the chroma frequency band that includes the chroma sub-carrier frequency. Various aspects may analyze the filtered intra-frame signal to determine whether three-dimensional comb filtering the current signal may be appropriate. For example, and without limitation, various aspects may compare the filtered intra-frame luma signal to one or more thresholds to determine whether three-dimensional comb filtering the current signal may be appropriate. Also, for example, various aspects may compare the filtered intra-frame luma signal to the filtered inter-frame luma signal and analyze the difference to determine whether three-dimensional comb filtering the current signal may be appropriate. Various aspects of the present invention may also comprise method steps and system components that generate, filter and analyze a second intra-frame luma signal to determine whether three-dimensionally comb filtering the current signal may be appropriate.

These and other advantages, aspects and novel features of the present invention, as well as details of illustrative aspects thereof, will be more fully understood from the following description and drawings.

DETAILED DESCRIPTION OF THE INVENTION

Figure 1:
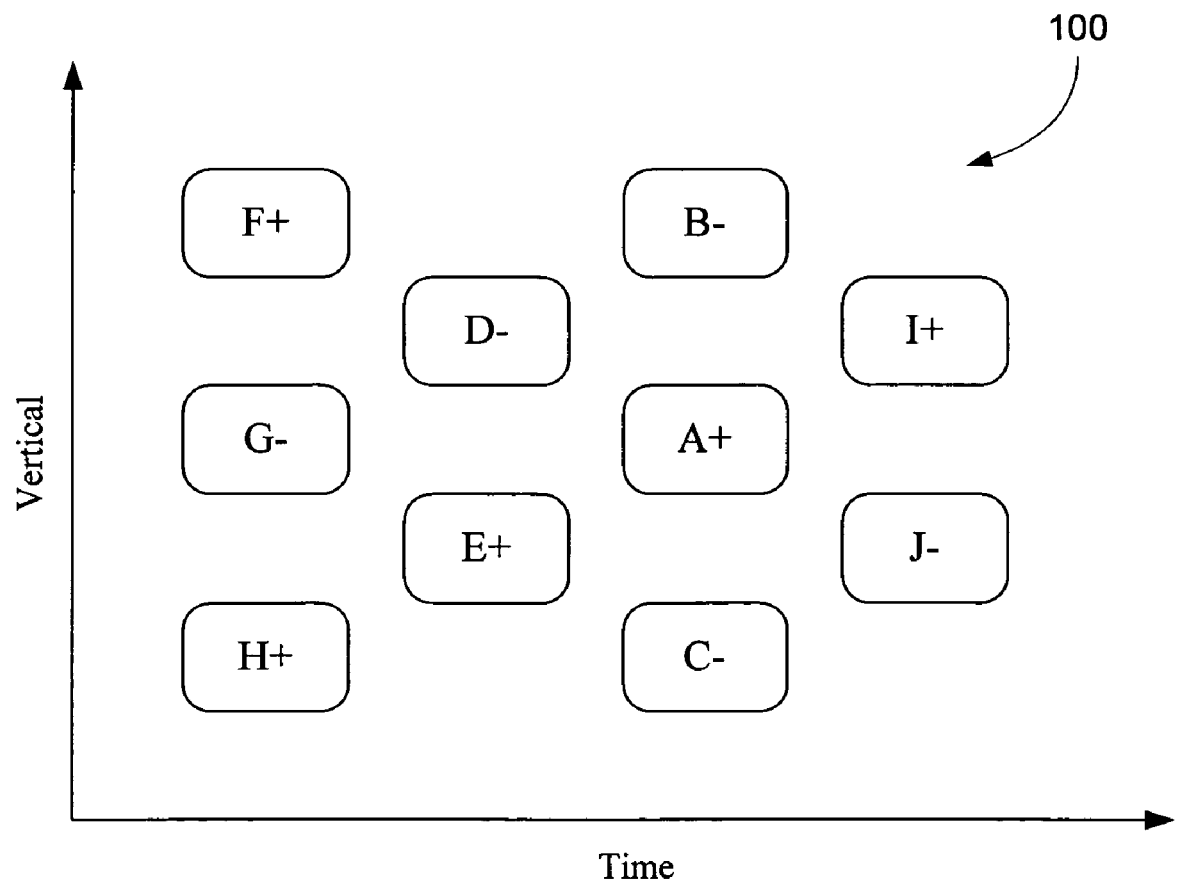
FIG. 1 is a diagram illustrating exemplary spatial and temporal alignment of video information.

FIG. 1 is a diagram 100 illustrating exemplary spatial and temporal alignment of video information. The vertical axis of the diagram 100 shows the vertical spatial relationship, or vertical displacement, between the signals (or samples), while the horizontal axis of diagram 100 shows the temporal relationship, or time shift, between the signals. For illustrative purposes, consider all of the signals (or samples) illustrated in FIG. 1 to be spatially horizontally aligned (i.e., aligned in the horizontal spatial dimension not represented in the diagram 100). For the following discussion, the illustrative signals, A–J, will be referred to generally as signals. The signals may, for example, represent a single digitally sampled pixel value of video information, but may also represent entire video lines of video information or other groupings of pixel information where appropriate.

Consider, for example, the current signal of interest may be the signal labeled "A." Signal G may represent a signal corresponding spatially (i.e., vertically spatially by the vertical axis of the diagram, and horizontal spatially by the above assumption) to sample A, but not temporally. In other words, the diagram 100 shows signals A and G with no relative vertical displacement, but with a displacement along the horizontal axis, which is the time domain. The diagram 100 may, for example, represent signal G as spatially corresponding to signal A, but temporally corresponding to the video frame just prior to the video frame of signal A.

The diagram 100 also, for example, illustrates signal B, which may represent a signal that corresponds temporally to sample A (i.e., the diagram 800 shows no horizontal displacement between signals A and B). For example, signal B may be from the same video field as signal A. However, the diagram 100 also indicates a vertical displacement between samples A and B. Thus, signal B may be, for example, spatially horizontally aligned with signal A (by the above assumption), temporally aligned with signal A (as shown by the horizontal axis of the diagram 800), and spatially vertically displaced from signal A (as shown by the vertical axis of the diagram 800). For example, signal B may represent information of the video pixel directly above a pixel represented by signal A on a video screen. Similarly, signal C may represent information of the video pixel directly below the pixel represented by signal A on a video screen.

Similarly, signals D and E may represent signals in the video field just prior to the video field of signals B, A and C. Likewise, signals I and J may represent signals in the video field just after the video field of signals B, A and C. Lastly, signals F, G and H may represent signals corresponding to signals B, A and C in the video field just prior to the video field of signals B, A and C. Note that for FIG. 1 and for the following discussion, one video frame will correspond to two video fields. However, the particular relationship between signals illustrated in the diagram 800 are for explanatory and illustrative purposes. Accordingly, various aspects of the present invention should, by no means, be limited to particular spatial and temporal relationships between signals.

Also shown in FIG. 1, the plus and minus signs in the diagram 100 indicate relative phase of the chroma sub-carrier in the signal. For example since signal A has a chroma sub-carrier with a relative phase of "+," signals F, H, E and I have respective chroma sub-carriers with the same phase as signal A. Conversely, since signals G, D, B, C and J each have phase indications of "-," their chroma sub-carriers are 180 degrees out of phase with the chroma sub-carrier of signal A.

Figure 2:
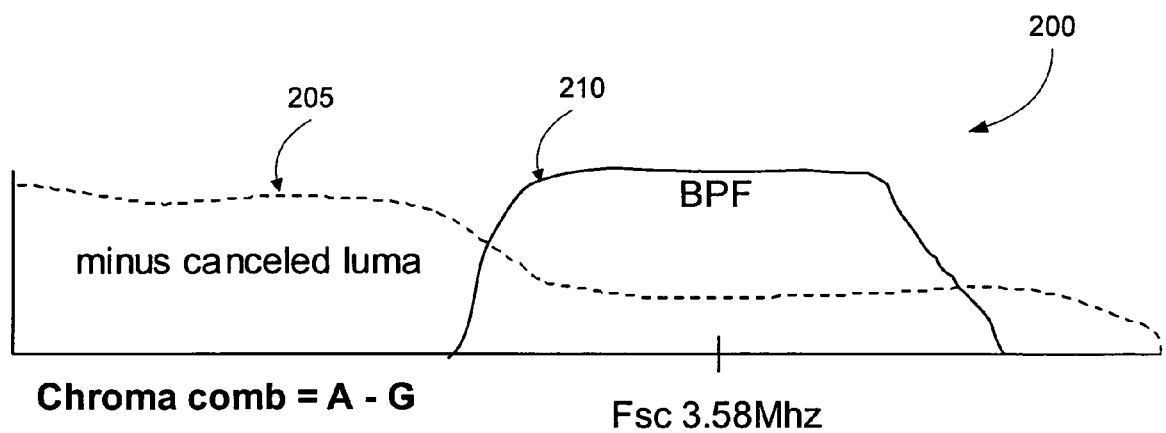
FIG. 2 is a diagram illustrating spectral content of an exemplary chroma comb signal.

This phase relationship, as discussed earlier, may be useful in filtering signals. For example, in video applications, the signals may contain both chroma and luma information. A method of extracting a chroma component may, for example, include subtracting two signals with opposite chroma phases to cancel out the luma component and leave the chroma component. FIG. 2 is a diagram 200 illustrating spectral content of an exemplary chroma comb signal 210 formed by subtracting an exemplary signal G– from a corresponding signal A+ with opposite chroma phase.

The dashed line 205 illustrates the luma signal component cancelled by so processing signals A and G. The frequency spectrum of the resulting chroma comb signal 210 shows the spectral components associated with the remaining chroma signal component. In this example, the chroma sub-carrier is centered at a frequency of 3.58 MHz and may have a bandwidth approximately illustrated by the solid line 210. Various signal processing methods may include filtering the chroma signal using a band-pass filter (BPF) to remove signal components outside the expected bandwidth of a chroma signal. Various other signal processing methods may include, for example, band-stop filtering the chroma signal using a band-stop filter (BSF) to analyze remaining luma components that may not have cancelled during the chroma signal forming process. This may provide an indication as to the quality or integrity of the chroma comb signal. Note that, as illustrated by the dashed line 205, luma frequency components may exist in the chroma band.

Figure 3:
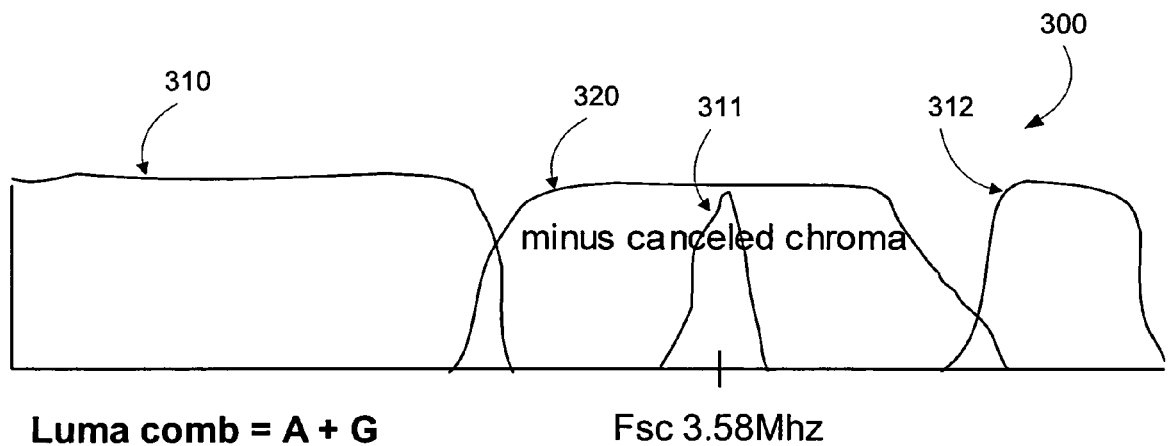
FIG. 3 is a diagram illustrating spectral content of an exemplary luma comb signal.

A method of extracting luma components from an original signal may include, for example, adding the original signal and a corresponding signal with an opposite chroma phase to cancel out the chroma component and leave the luma component. FIG. 3 is a diagram 300 illustrating spectral content of an exemplary luma comb signal 310–312 formed by adding exemplary signals A+ and G−. The line 320 shows the cancelled chroma component. The exemplary center luma comb signal spectral component 311 near the chroma sub-carrier frequency Fsc illustrates that even after forming the luma comb signal, there may be luma frequency components in the chroma frequency band. Various signal processing methods may include, for example, band-pass filtering the frequency band expected for chroma signals to analyze signals remaining in this band. Such signals may include luma components in the chroma band or may, for example, include chroma components that did not properly cancel while forming the luma comb signal.

Figure 4:
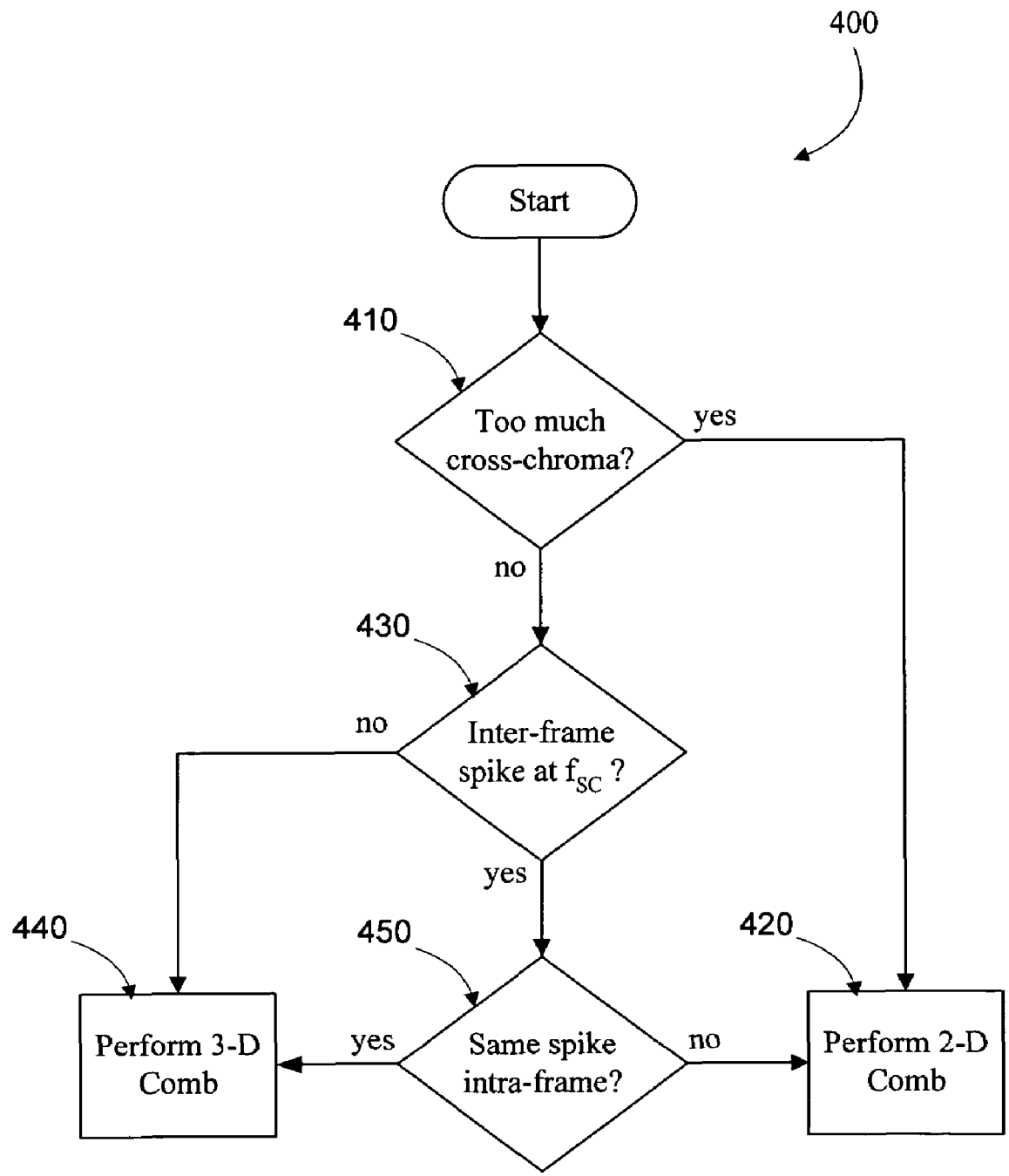
FIG. 4 is a diagram illustrating a method for determining whether to process a current signal using three-dimensional comb filtering in accordance with various aspects of the present invention.

FIG. 4 is a diagram illustrating a method 400 for determining whether to process a current signal with three-dimensional comb filtering in accordance with various aspects of the present invention. The method 400 may include aspects assessing expected quality of the current signal if processed by three-dimensional comb filtering. The method 400 may include, at step 410, determining if there is too much chroma cross-talk. The step 410 may include forming a chroma comb signal (also referred to as "chroma signal"), as illustrated in FIG. 2, by subtracting a signal from a previous video frame that corresponds spatially to the current signal from the current video frame. This process may be referred to as "frame combing," because it may involve processing signals in separate video frames, and may be incorporated in three-dimensional comb filtering. Alternatively, frame combing may include forming chroma or luma signals by subtracting or adding signals between other combinations of fields or frames, for example, by subtracting a signal from a following video frame that corresponds spatially to the current signal from the current video frame.

The step 410 may then include, for example, forming a filtered chroma signal by filtering out (or removing) the band of frequency components expected for a chroma signal (i.e., the chroma frequency band). Filtering the chroma signal in this manner should leave mostly luma signal components that did not cancel in the chroma comb signal forming process, along with noise components. Since, in a good frame comb, all of the luma signal components should have cancelled, analyzing the remaining luma signal components may provide an indication of the quality or integrity of the chroma signal formed with the frame comb.

The step 410 may include, for example, comparing the filtered chroma signal to a threshold to determine if the amount of signal remaining in the filtered chroma signal is acceptable. If the remaining signal is too strong, this may be an indication that the quality or integrity of the frame comb involving the current signal is relatively poor. A poor frame comb, in turn, may be an indication that performing three-dimensional comb filtering with the current signal is not appropriate. In this example, if the remaining signal is above a threshold, the method 400 flow proceeds to step 420, which includes processing the current signal using a two-dimensional comb filtering process instead of a three-dimensional comb filtering process.

If the remaining signal is below the threshold, however, the method 400 may perform further analysis, beginning at step 430. Step 430 may include forming an inter-frame luma signal, for example, by processing the current signal and a corresponding signal from a previous frame. For example, referring to FIG. 1, such processing may include performing frame combing using exemplary current signal A and corresponding signal G from a previous frame. Step 430 may include band-pass filtering the inter-frame luma signal to analyze the frequency components of the inter-frame luma signal near the chroma sub-carrier frequency.

A strong inter-frame luma signal frequency component near the chroma sub-carrier frequency typically corresponds to chroma components that did not properly cancel during the luma signal forming process. Conversely, an absence of a strong inter-frame luma signal frequency component near the chroma sub-carrier frequency may correspond to proper chroma cancellation during the frame combing operation and, accordingly, serve as an indication that three-dimensional comb filtering the current signal will likely yield good results. Thus, the exemplary step 430 may compare the filtered inter-frame luma signal to a threshold. If the filtered inter-frame luma signal is less than the threshold, then the step 430 determines that three-dimensional comb filtering the current signal will likely yield good results. Accordingly, the method 400 flow moves to step 440, to perform signal processing with the current signal that includes three-dimensional comb filtering.

Though a strong inter-frame luma signal frequency component near the chroma sub-carrier frequency may typically correspond to chroma components that did not properly cancel, this may not be the case. For example, various video image characteristics, such as certain types of vertical lines, may result in a strong luma component at or near the chroma sub-carrier frequency. Accordingly, if step 430 determines that the filtered inter-frame luma signal is above the threshold, then the method 400 flow moves to step 450 for further processing.

Method step 450 generally corresponds to performing further processing to determine if the strong inter-frame luma signal frequency component detected near the chroma sub-carrier frequency in step 430 has an explanation other than poorly cancelled chroma. Method step 450 illustrates one such test, which includes utilizing line combing to determine if the image includes a vertical line of a nature that results in a strong inter-frame luma signal frequency component near the chroma sub-carrier frequency.

Method step 450 utilizes line combing to form a luma comb. Such line combing may include, for example, adding the current signal, which may represent a video pixel, to a second signal representing a vertically adjacent pixel above or below the current pixel. The second signal thus may represent a signal that spatially horizontally corresponds to the current signal and temporally corresponds to the current signal, but represents video information that is spatially vertically displaced from the video information represented by the current signal.

Method step 450 may include band-pass filtering the intra-frame luma signal to analyze the frequency components of the intra-frame luma signal near the chroma sub-carrier frequency. Such analysis may include, for example, comparing the magnitude of the filtered intra-frame luma signal to a threshold. Alternatively, such analysis may include, for example, comparing the filtered intra-frame luma signal to the filtered inter-frame luma signal. If the difference between the filtered intra-frame luma signal and the filtered inter-frame luma signal is relatively small, step 450 may determine that the strong frequency component in the luma signals near the chroma sub-carrier frequency is likely natural and accordingly, that three-dimensional comb filtering is appropriate. Conversely, if the difference between the filtered intra-frame luma signal and the filtered intra-frame luma signal is high, the step 450 may determine that the strong frequency component in the inter-frame luma signal near the chroma sub-carrier frequency could likely be due to poor chroma cancellation in the frame comb, and accordingly, that three-dimensional comb filtering the current signal may not be appropriate.

Method step 450 may include utilizing comparisons between the inter-frame luma signal and multiple intra-frame luma signals. For example, method step 450 may include utilizing line combing to form a second intra-frame luma signal. The first intra-frame luma signal may result from line combing the current signal and the corresponding signal vertically above the current signal, and the second intra-frame luma signal may result from line combing the current signal and the corresponding signal vertically below the current signal. The method 450 may also include generating a second filtered intra-frame luma signal by, for example, filtering the second intra-frame luma signal in a manner similar to the first intra-frame luma signal.

The method step 450 may then analyze the inter-frame and intra-frame luma signals to determine the expected quality from three-dimensionally comb filtering the current signal. For example, method step 450 may determine that if one or both of the intra-frame signals (or filtered versions thereof) include frequency components near the chroma sub-carrier frequency that are above a threshold (or respective thresholds), then the strong frequency component in the inter-frame luma signal near the chroma sub-carrier frequency is not likely due to poor chroma cancellation. Accordingly, three-dimensional comb filtering the current signal may be expected to yield a high quality result and may be appropriate. Conversely, method step 450 may determine that if one or both of the intra-frame signals (or filtered versions thereof) include frequency components near the chroma sub-carrier frequency that are not above a threshold (or respective thresholds), then the strong frequency component near the chroma sub-carrier in the inter-frame luma signal could be due to poor chroma cancellation. Accordingly, three-dimensional comb filtering the current signal may not be expected to reliably yield a high quality result and thus may not be appropriate.

The method step 450 may also base its assessment of the likely quality of three-dimensionally filtering the current signal on comparisons between the inter-frame luma and multiple intra-frame luma signals (or the filtered versions thereof). For example, method step 450 may determine respective amounts of difference between the filtered inter-frame luma signal and the filtered intra-frame luma signals. The method step 450 may then compare the respective amounts of difference to a threshold (or respective thresholds) to determine whether three-dimensionally comb filtering the current signal will likely yield a high quality result and therefore be appropriate. The method step 450 may, for example, require one or both of the respective amounts of difference to be below a threshold (or respective thresholds) for the method step 450 to determine that three-dimensional comb filtering the current signal will likely yield a high quality result.

Figure 5:
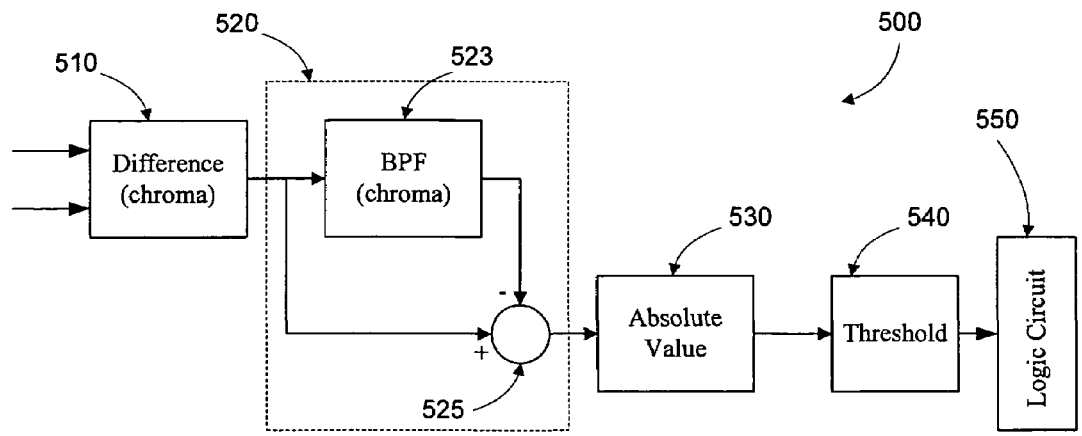
FIG. 5 is a diagram illustrating a system for analyzing crosstalk in a chroma signal in accordance with various aspects of the present invention.

FIG. 5 is a diagram illustrating a system 500 for analyzing crosstalk in a chroma signal in accordance with various aspects of the present invention. The system 500 may, for example, be utilized to implement method step 410 from the method 400 illustrated in FIG. 4, or portions thereof. The system 500 includes a difference circuit 510 that receives two input signals and generates an output signal indicative of the difference between the two input signals. For example the two input signals may include a current signal and a signal from a prior video frame that spatially corresponds to the current signal. The difference circuit 510, so configured, may perform a frame comb resulting in a chroma signal. As discussed previously, taking a difference between corresponding signals in adjacent video frames may ideally result in canceling the luma components in the signals and leaving the chroma components. The output signal of the difference circuit 510 may, for example, have a frequency spectrum such as that illustrated in FIG. 2.

The output of the difference circuit 510 is coupled to a filter circuit 520. The filter circuit 520 is a band-stop filter that includes a band-pass filter 523 and a second difference circuit 525. Referring to both FIG. 5 and FIG. 2, the band-pass filter 523 may, for example, filter out the frequency band expected for chroma signal components. This frequency band may, for example, generally coincide with the chroma frequency band 210 illustrated in FIG. 2. The output of the band-pass filter 523 and the output of the difference circuit 510 are coupled to the second difference circuit 525. The resulting difference between the difference circuit 510 and the band-pass filter 523 is a filtered chroma signal. The filtered chroma signal corresponds generally to the chroma signal output from the difference circuit 510 with the chroma frequency band removed.

For a perfect chroma comb, that is where all of the luma components cancel perfectly and no chroma components exist outside of the removed chroma frequency band, there should be little, if any, signal remaining. The filtered chroma signal from the second difference circuit 525 is input to an absolute value circuit 530 that receives the filtered chroma signal and outputs the magnitude of the filtered chroma signal. The system 500 includes a comparator circuit 540 that compares the magnitude of the filtered chroma signal output from the absolute value circuit 530 to a threshold. The comparator circuit 540 outputs a signal indicative of the results of the comparison to subsequent signal processing circuitry, such as the logic circuit 550, for further processing.

The output of the comparator circuit 540 may, for example, be a binary signal, indicative of whether the magnitude of the filtered chroma signal is greater than the threshold. For example, in an inter-frame chroma-combing scenario, the threshold may represent the maximum amount of signal remaining in the filtered chroma signal that is acceptable for processing the current signal using three-dimensional combing. More signal in the filtered chroma signal than the threshold amount may be an indication of poor frame combing (or mesh failure). Thus, an output from the comparator circuit 540 that indicates the filtered chroma signal has a greater magnitude than the threshold may also indicate to downstream signal processing circuitry, such as the logic circuit 550, that two-dimensional comb filtering is more appropriate than three-dimensional comb filtering for the current signal.

Alternatively, the output of the comparator circuit 540 may be a digitally quantized or analog signal indicative of the magnitude of the difference between the magnitude of the filtered chroma signal and the threshold. Downstream signal processing systems, such as the logic circuit 550, may utilize such a non-binary indication, along with other signals, to determine whether the expected quality of three-dimensionally filtering the current signal warrants three-dimensional filtering.

Figure 6:
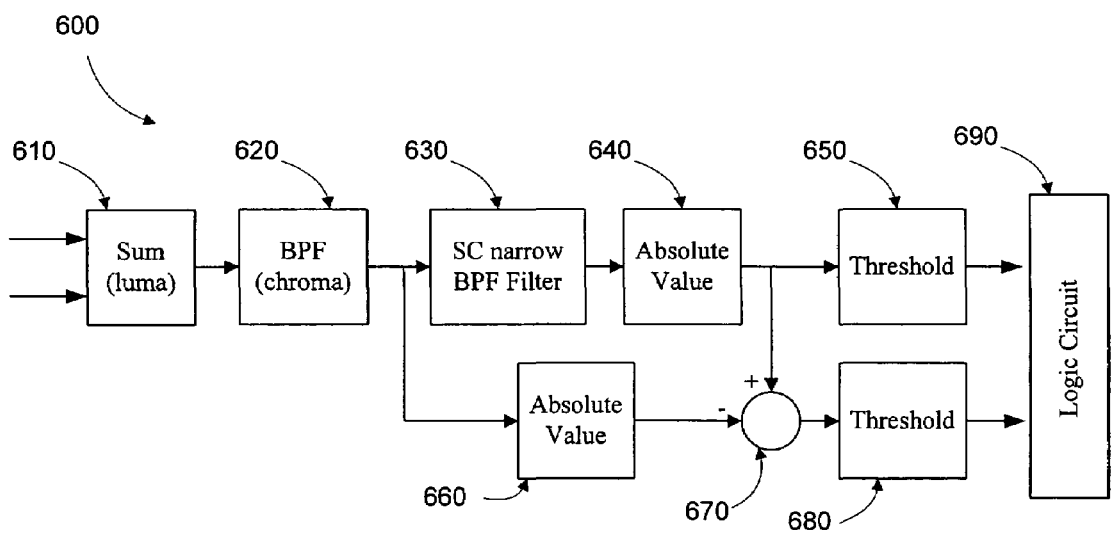
FIG. 6 is a diagram illustrating a system for analyzing crosstalk in luma signal in accordance with various aspects of the present invention.

FIG. 6 is a diagram illustrating a system 600 for analyzing crosstalk in a luma signal (or "cancelled-chroma signal") in accordance with various aspects of the present invention. The system 600 may, for example, be utilized to implement aspects of steps 430 and 450 of the method 400 illustrated in FIG. 4, or portions thereof. For example, the system 600 may be utilized to analyze signal content in inter-frame luma signals and intra-frame luma signals.

The system 600 includes a summing circuit 610. The summing circuit 610 may, for example, receive as inputs the current signal and a signal from a prior video frame that spatially corresponds to the current signal. The summing circuit 610 may add the two signals to produce a corresponding signal with chroma components removed and luma components remaining. Such a signal will be referred to as a chroma-cancelled signal or luma signal. If the luma signal is generated by processing signals in different video frames, the luma signal may be referred to as an inter-frame luma signal, and if the luma signal is generated by processing signals in the same video frame, the luma signal may be referred to as an intra-frame luma signal.

The summing circuit 610 is coupled to a first filtering circuit 620, which may include a band-pass filter that passes the chroma frequency band and filters out other frequency components. The filtering circuit 610 may, for example, output a signal with a frequency spectrum shown in FIG. 3 by lines 311, and portions of lines 310 and 312 under the chroma line 320. The first filtering circuit 620 may output a filtered inter-frame luma signal or filtered intra-frame luma signal that contains signal frequency components in the chroma frequency band.

A substantial frequency component in a luma signal near the chroma sub-carrier frequency may indicate the existence of chroma components that did not cancel properly during formation of the luma signal. Conversely, the absence of such a substantial frequency component may be indicative of properly cancelled chroma components. Thus, various aspects of the present invention may include analyzing the frequency components in the luma signal that are near the chroma sub-carrier frequency.

Accordingly, the system 600 includes a narrow band-pass filter 630 that is centered near the chroma sub-carrier frequency. The output of the narrow band-pass filter 630 may resemble, for example, luma line 311 in FIG. 3. The system 600 may determine the magnitude of the narrow-band-filtered luma signal using a first absolute value circuit 640. The system 600 may then compare the magnitude of the narrow-band-filtered luma signal to a first threshold using a first comparator circuit 650, which outputs a signal indicative of the comparison. The signal indicative of the comparison may be, for example, a binary indication or a digitally quantized or analog signal representative of the magnitude of the comparison. The first comparator circuit 650 may, for example, output a signal indicative of the comparison to a logic circuit 690 for further processing.

For example, if the first comparator circuit 650 outputs an indication that the magnitude of a narrow-band-filtered inter-frame luma signal is less than the first threshold, this signal may indicate an expected high quality for the current signal processed using three-dimensional comb filtering. Subsequent signal processing circuitry, such as the logic circuit 690, may then utilize such a signal to enable three-dimensional comb filtering for the current signal. Conversely, if the first comparator circuit 650 outputs an indication that the magnitude of a narrow-band-filtered inter-frame luma signal is greater than the first threshold, subsequent signal processing circuitry, such as the logic circuit 690, may utilize such a signal to enable two-dimensional comb filtering for the current signal, or alternatively, to enable further signal analysis.

Additional various aspects of the present invention may include processing the frequency components of the filtered luma signal that are not near the chroma sub-carrier frequency. Accordingly, the system 600 includes a second absolute value circuit 660 that determines the magnitude of the filtered luma signal output from the first filtering circuit 620. The system 600 also includes a difference circuit 670 that determines the difference between the narrow-band-filtered luma signal and the filtered luma signal. The difference circuit 670 outputs a signal indicative of this difference. The system 600 includes a second comparator circuit 680 to compare the difference signal output from the difference circuit 670 to a second threshold. The second comparator circuit 680 may then output a signal indicative of this comparison. Subsequent signal processing circuitry, such as the logic circuit 690, may utilize the signals output from the first comparator circuit 650 and second comparator circuit 660 to assess the expected quality of the current signal processed using three-dimensional or two-dimensional comb filtering.

Though the previous discussion was generally directed to processing an inter-frame luma signal, the system 600 may also similarly process intra-frame luma signals and other signals in a similar manner.

Figure 7:
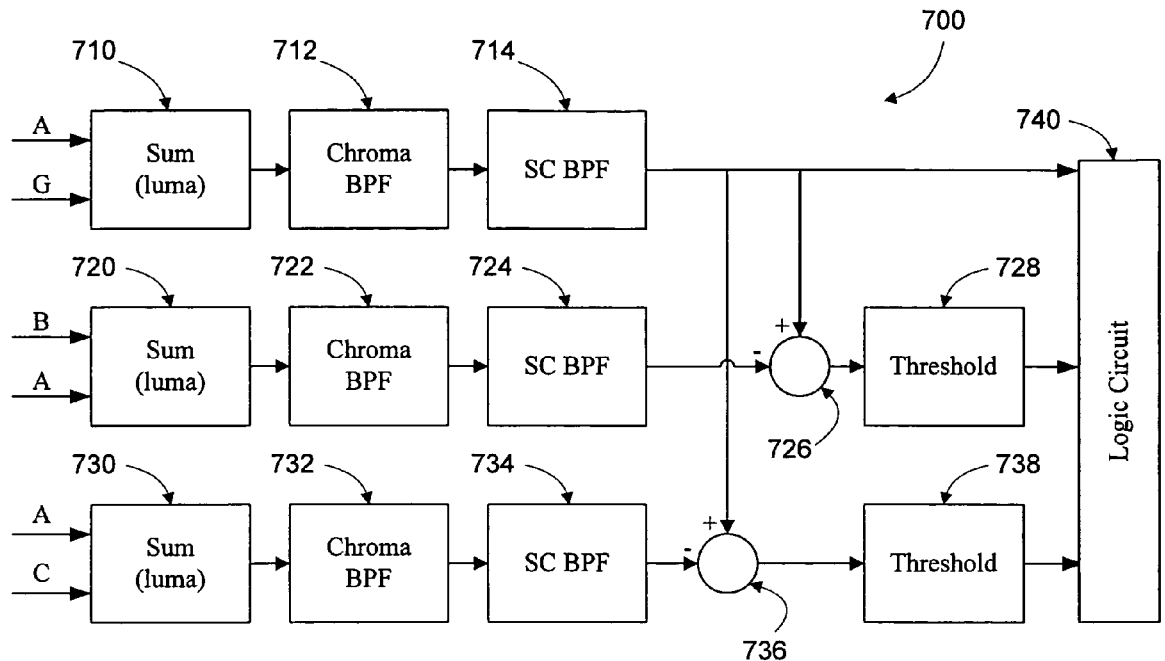
FIG. 7 is a diagram illustrating a system for analyzing crosstalk in frame-combed and line-combed luma signals in accordance with various aspects of the present invention.

FIG. 7 is a diagram illustrating a system 700 for analyzing crosstalk in frame-combed and line-combed luma signals in accordance with various aspects of the present invention. The system 700 utilizes aspects of the system 600 shown in FIG. 6 to generate signals that may be utilized, for example, in steps 430 and 450 of FIG. 4.

The first row of the system 700 utilizes a first summing circuit 710 to generate an inter-frame luma signal by summing signals A and G (refer to FIG. 1 discussion). The first filter circuit 712 filters out frequency components from the inter-frame luma signal that are not in the chroma frequency band. The first narrow-band-pass filter 714 filters out frequency components from the inter-frame luma signal that are not near the chroma sub-carrier frequency. The first narrow band-pass filter 714 may pass a frequency band that is narrower than the chroma frequency band. For example, the first narrow band-pass filter 714 may pass 75%, 50%, 25% or 10% of the frequency band passed by the first filter circuit 712. The first narrow-band-pass filter 714 then outputs a narrow-band-filtered inter-frame luma signal, which may be processed by subsequent signal processing circuitry (e.g., threshold comparator circuits). The system 700 is illustrated utilizing two-stage filtering. Such two-stage filtering may be utilized or not, depending on the quality of the filters and the system requirements. Accordingly, various aspects of the present invention should, by no means, be limited to particular filter designs or implementations.

The second row of the system 700 utilizes a second summing circuit 720 to generate a first intra-frame luma signal by summing signals A and B (refer to FIG. 1 discussion). The second filter circuit 722 filters out frequency components from the first intra-frame luma signal that are not in the chroma frequency band. The second narrow-band-pass filter 724 filters out frequency components from the first intra-frame luma signal that are not near the chroma sub-carrier frequency. The second narrow band-pass filter 724 may pass a frequency band that is narrower than the chroma frequency band. For example, the second narrow band-pass filter 724 may pass 75%, 50%, 25% or 10% of the frequency band passed by the second filter circuit 722. The second narrow-band-pass filter 724 then outputs a first narrow-band-filtered intra-frame luma signal.

The system 700 includes a first difference circuit 726 that determines the difference between the narrow-band-filtered inter-frame luma signal and the first narrow-band-filtered intra-frame luma signal. The system 700 includes a first comparator circuit 728 that compares the difference output from the first difference circuit 726 to a threshold. The first comparator circuit 728 then outputs an indication of this difference, which may be processed by subsequent signal processing circuitry, such as logic circuit 740, to determine an expected quality of signal resulting from three-dimensionally filtering the current signal ("A").

Alternatively, the system 700 may by-pass the first difference circuit 726 and compare the magnitude of the first narrow-band-filtered intra-frame luma signal to the first threshold. This will be discussed later in the discussion regarding FIG. 11.

The third row of the system 700 utilizes a third summing circuit 730 to generate a second intra-frame luma signal by summing signals A and C (refer to FIG. 1 discussion). The third filter circuit 732 filters out frequency components from the second intra-frame luma signal that are not in the chroma frequency band. The third narrow-band-pass filter 734 filters out frequency components from the second intra-frame luma signal that are not near the chroma sub-carrier frequency. The third narrow band-pass filter 734 may pass a frequency band that is narrower than the chroma frequency band. For example, the third narrow band-pass filter 734 may pass 75%, 50%, 25%, 10% or 5% of the frequency band passed by the second filter circuit 732. The third narrow-band-pass filter 734 then outputs a second narrow-band-filtered intra-frame luma signal.

The system 700 includes a second difference circuit 736 that determines the difference between the narrow-band-filtered inter-frame luma signal and the second narrow-band-filtered intra-frame luma signal. The system 700 includes a second comparator circuit 738 that compares the difference output from the second difference circuit 736 to a threshold. The second comparator circuit 738 then outputs an indication of this difference, which may be processed by subsequent signal processing circuitry, such as the logic circuit 740, to determine an expected quality of signal resulting from three-dimensionally filtering the current signal ("A").

Figure 8:
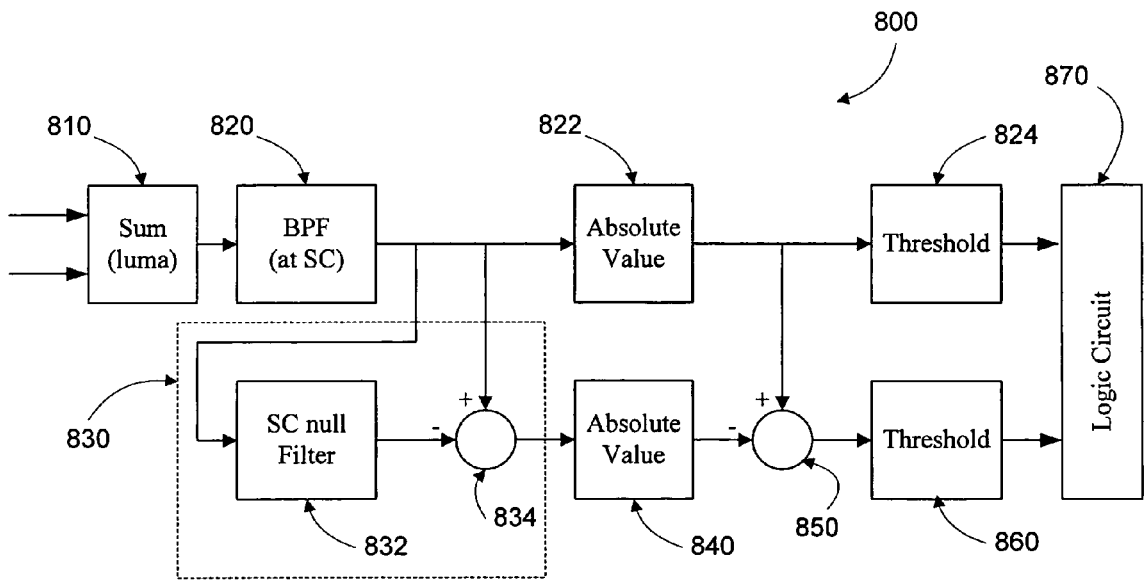
FIG. 8 is a diagram illustrating a system for analyzing crosstalk in a luma signal in accordance with various aspects of the present invention.

FIG. 8 is a diagram illustrating a system 800 for analyzing crosstalk in a luma signal in accordance with various aspects of the present invention. The system 800 is generally a variation on the system 600 shown in FIG. 6. The system may, for example, be utilized to implement aspects of steps 430 and 450 of the method 400 illustrated in FIG. 4, or portions thereof. For example, the system 800 may be utilized to analyze signal content in inter-frame luma signals and intra-frame luma signals.

The system includes a summing circuit 810. The summing circuit 810 may, for example, receive as inputs the current signal and a signal from a previous video frame that spatially corresponds to the current signal. Alternatively, for example, the summing circuit 810 may receive as inputs the current signal and a corresponding signal from an adjacent video line. The summing circuit 810 may add the two signals to produce a luma signal. If the luma signal is generated by processing signals in different video frames, the luma signal may be referred to as an inter-frame luma signal, and if the luma signal is generated by processing signals in the same video frame, the luma signal may be referred to as an intra-frame luma signal.

The summing circuit 810 is coupled to a first filtering circuit 820, which may include a band-pass filter that passes frequency components expected for chroma signal components (i.e., the chroma frequency band) and filters out other frequency components. The filtering circuit 820 may, for example, output a signal with a frequency spectrum resembling that shown in FIG. 3 by lines 311, and portions of lines 310 and 312 under the chroma line 320. The filtering circuit 820 may output a filtered inter-frame luma signal or filtered intra-frame luma signal that contains signal frequency components in the chroma frequency band.

The filtering circuit 820 may be coupled to a first absolute value circuit 822 that outputs a signal indicative of the magnitude of the filtered luma signal output from the filtering circuit 820. The system 800 may then include a first comparator circuit 824 that compares the magnitude of the filtered luma signal output from the first absolute value circuit 822 to a first threshold. The filtering circuit 820 may output a signal indicative of the results of the comparison to subsequent signal processing circuitry, such as logic circuit 870, for further processing.

The system 800 includes a narrow band-pass filter 830 that may be centered, for example, near the chroma sub-carrier frequency. The narrow band-pass filter 830 illustrated in FIG. 8 utilizes a sub-carrier null filter 832 and a first difference circuit 834 to implement the narrow band-pass filter 830. Such a filter 830 may be constructed in a variety of ways, and accordingly, the scope of various aspects of the present invention should, by no means, be limited to particular filter configurations. The output of the narrow band-pass filter 830 may resemble, for example, luma line 311 in FIG. 3, or a sub-section thereof. The system 800 may generate the magnitude of the narrow-band-filtered luma signal using a first absolute value circuit 840.

The system 800 may include a second difference circuit 850 that generates a difference between the filtered luma signal output from the first absolute value circuit 822 and the narrow-band-filtered luma signal output from the second absolute value circuit 840. The system 800 may then utilize a second comparator circuit 860 to compare the difference output from the second difference circuit 850 to a threshold and output a signal indicative of this comparison. The signal indicative of the comparison may be, for example, a binary indication or a digitally quantized or analog signal representative of the magnitude of the comparison.

Subsequent signal processing circuitry, such as the logic circuit 870, may utilize the signals output from the first 824 and second 860 comparator circuits to determine an expected quality for the current signal if processed using three-dimensional comb filtering or other filtering. For example, if the first comparator circuit 824 outputs an indication that the magnitude of a filtered inter-frame luma signal is greater than the first threshold, and the second comparator circuit 860 outputs an indication that indicates that a substantial portion of the frequency content of the filtered inter-frame luma signal is centered at the sub-carrier frequency, the subsequent logic circuitry may determine that either further processing is necessary or that the expected quality of the current signal processed by three-dimensionally comb filtering is low. Conversely, for example, if the first comparator circuit 824 outputs an indication that the magnitude of the filtered inter-frame luma signal is below the first threshold, then the subsequent logic circuitry 870 may indicate that the expected quality of the current signal processing by three-dimensionally filtering is high. Also, for example, if the first comparator circuit 824 outputs an indication that the magnitude of the filtered inter-frame luma signal is above the first threshold, but the second comparator circuit 860 outputs an indication that a substantial portion of the filtered inter-frame luma signal is not located near the chroma sub-carrier frequency, then the subsequent logic circuitry 870 may determine that the expected quality of three-dimensionally filtering the current signal is high.

Figure 9:
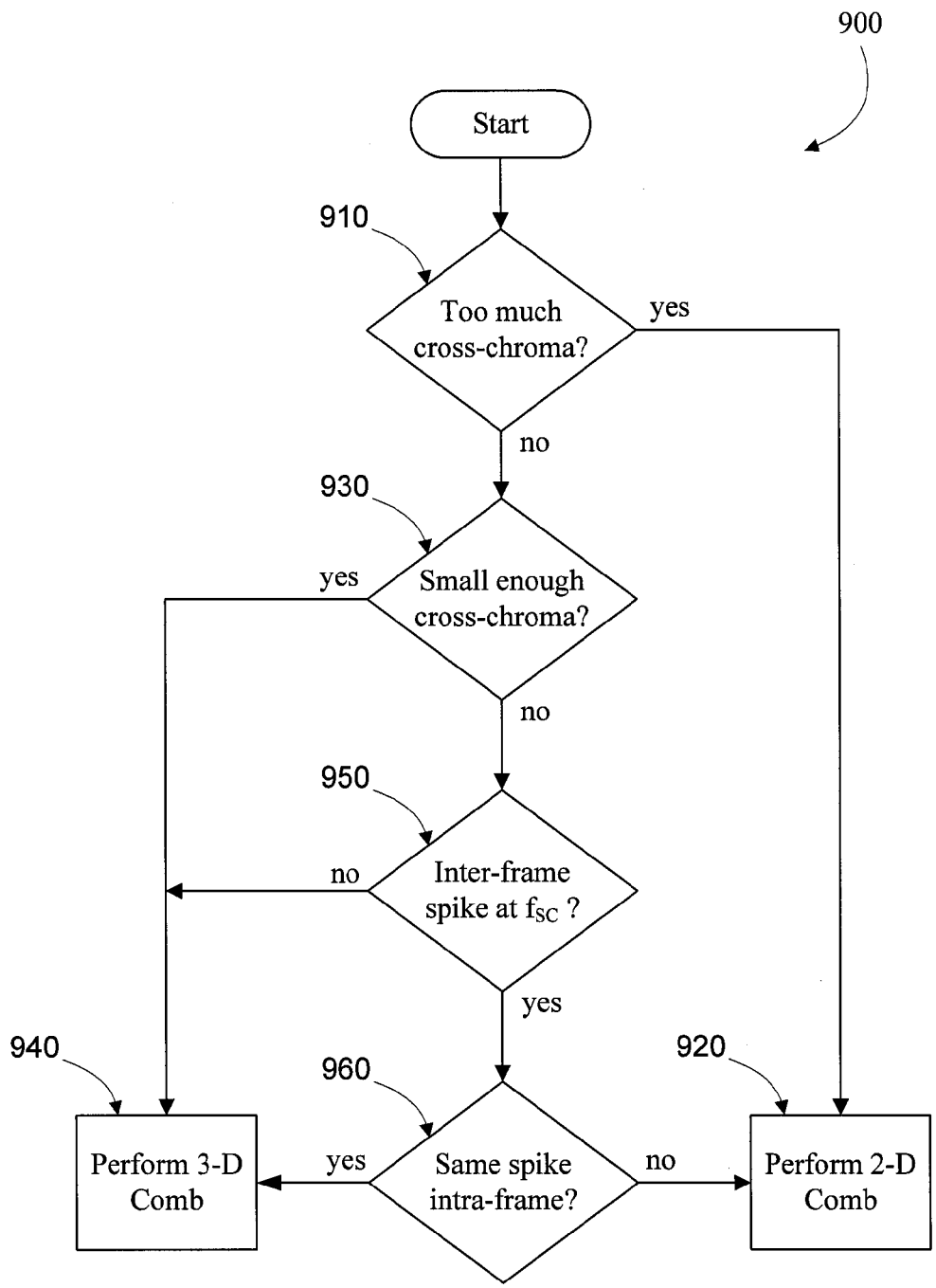
FIG. 9 is a diagram illustrating a method for determining whether to process a current signal using three-dimensional comb filtering in accordance with various aspects of the present invention.

FIG. 9 is a diagram illustrating a method 900 for determining whether to process a current signal using three-dimensional comb filtering in accordance with various aspects of the present invention. The method 900 may include aspects assessing expected quality of the current signal if processed using three-dimensional comb filtering. The method 900 includes determining if there is too much chroma cross-talk at step 910. The step 910 may include forming a chroma comb signal (also referred to as "chroma signal"), as illustrated in FIG. 2, by subtracting from the current signal a signal from a previous video frame that corresponds spatially to the current signal.

The step 910 may then include, for example, forming a filtered chroma signal by filtering out (or removing) the band of frequency components expected for a chroma signal (i.e., the chroma frequency band). Filtering the chroma signal in this manner should leave mostly luma signal components that did not cancel in the chroma comb signal forming process. Since, in an ideal chroma frame comb, all of the luma signal components should have cancelled, analyzing the remaining luma signal components may provide an indication of the quality or integrity of the chroma signal formed with the frame comb.

The step 910 may include, for example, comparing the filtered chroma signal to a maximum acceptable threshold to determine if the amount of signal remaining in the filtered chroma signal is acceptable. If the remaining signal is too strong, this may be an indication that the quality or integrity of the frame comb involving the current signal is relatively poor. A poor frame comb, in turn, may be an indication that performing three-dimensional comb filtering with the current signal is not appropriate. In this example, if the remaining signal is above the maximum acceptable threshold, the method 900 flow proceeds to step 920, which includes processing the current signal using a two-dimensional comb filtering process instead of a three-dimensional comb filtering process.

If the remaining signal is below the maximum threshold, however, the method 900 may perform further analysis, beginning at step 930. Step 930 may include comparing the filtered chroma signal to a second threshold. If the magnitude of the filtered chroma signal is below the second threshold, then the step 930 determines that three-dimensional comb filtering the current signal is appropriate, and the method 900 flows to step 940, which performs three-dimensional comb filtering on the current signal.

If, however, the remaining signal is below the maximum threshold (as indicated at step 910) and not below the second threshold (as indicated at step 930) the method 900 flow may proceed to step 950 for additional processing to determine if three-dimensional comb filtering the current signal is appropriate. Step 950 may include forming an inter-frame luma signal, for example, by processing the current signal and a corresponding signal from a previous frame. For example, such processing may include performing frame combing using exemplary current signal A and corresponding signal G (as illustrated in FIG. 1) from a previous frame. Step 950 may include band-pass filtering the inter-frame luma signal to analyze the frequency components of the inter-frame luma signal near the chroma sub-carrier frequency.

A strong inter-frame luma signal frequency component near the chroma sub-carrier frequency typically corresponds to chroma components that did not properly cancel during the luma comb forming process. Conversely, an absence of a strong inter-frame luma signal frequency component near the chroma sub-carrier frequency may correspond to proper chroma cancellation during the frame combing operation and, accordingly, serve as an indication that three-dimensional comb filtering the current signal will likely yield good results. Thus, the exemplary step 950 may compare the filtered inter-frame luma signal to a threshold. If the filtered inter-frame luma signal is less than the threshold, then the step 950 determines that three-dimensional comb filtering the current signal will likely yield good results. Accordingly, the method 900 flow moves to step 940, to perform signal processing with the current signal that includes three-dimensional comb filtering.

Though a strong inter-frame luma signal frequency component near the chroma sub-carrier frequency may typically correspond to chroma components that did not properly cancel, this may not be the case. For example, various video image characteristics, such as certain types of vertical lines, may result in a strong luma component at or near the chroma sub-carrier frequency. Accordingly, if step 950 determines that the filtered inter-frame luma signal is above the threshold, then the method 900 flow moves to step 960 for further processing.

Method step 960 generally corresponds to performing further processing to determine if the strong inter-frame luma signal frequency component detected near the chroma sub-carrier frequency in step 950 has an explanation other than poorly cancelled chroma. Method step 960 illustrates one such test, which includes utilizing line combing to determine if the image includes a vertical line of a nature that results in a strong inter-frame luma signal frequency component near the chroma sub-carrier frequency.

Method step 960 utilizes line combing to form a luma comb. Such line combing may include, for example, adding the current signal, which may represent a video pixel, to a second signal representing a vertically adjacent pixel above or below the current pixel. The second signal thus may represent a signal that spatially horizontally corresponds to the current signal and temporally corresponds to the current signal, but represents video information that is spatially vertically displaced from the video information represented by the current signal.

Method step 960 may include band-pass filtering the intra-frame luma signal to analyze the frequency components of the intra-frame luma signal near the chroma sub-carrier frequency. Such analysis may include, for example, comparing the magnitude of the filtered intra-frame luma signal to a threshold. Alternatively, such analysis may include, for example, comparing the filtered intra-frame luma signal to the filtered inter-frame luma signal. If the difference between the filtered intra-frame luma signal and the filtered inter-frame luma signal is relatively small, step 960 may determine that the strong frequency component in the luma signals near the chroma sub-carrier frequency is not due to poor chroma canceling and accordingly, that three-dimensional comb filtering is appropriate. Conversely, if the difference between the filtered intra-frame luma signal and the filtered intra-frame luma signal is high, then step 960 may determine that the strong frequency component in the inter-frame luma signal near the chroma sub-carrier frequency could likely be due to poor chroma cancellation in the frame comb, and accordingly, that three-dimensional comb filtering the current signal may not be appropriate.

Method step 960 may include utilizing comparisons between the inter-frame luma signal and multiple intra-frame luma signals. For example, method step 960 may include utilizing line combing to form a second intra-frame luma signal. The first intra-frame luma signal may, for example, result from line combing the current signal and the corresponding signal vertically above the current signal, and the second intra-frame luma signal may result from line combing the current signal and the corresponding signal vertically below the current signal. The method 960 may also include generating a second filtered intra-frame luma signal by, for example, filtering the second intra-frame luma signal in a manner similar to the first intra-frame luma signal.

The method step 960 may then analyze the inter-frame and intra-frame luma signals to determine the expected quality from three-dimensionally comb filtering the current signal. For example, method step 960 may determine that if one or both of the intra-frame signals (or filtered versions thereof) include frequency components near the chroma sub-carrier frequency that are above a threshold (or respective thresholds), then the strong frequency component in the inter-frame luma signal near the chroma sub-carrier frequency is not likely due to poor chroma cancellation. Accordingly, three-dimensional comb filtering the current signal may be expected to yield a high quality result and may be appropriate. Conversely, method step 960 may determine that if one or both of the intra-frame signals (or filtered versions thereof) include frequency components near the chroma sub-carrier frequency that are not above a threshold (or respective thresholds), then the strong frequency component near the chroma sub-carrier in the inter-frame luma signal could be due to poor chroma cancellation. Accordingly, three-dimensional comb filtering the current signal may not be expected to reliably yield a high quality result and thus may not appropriate.

The method step 960 may also base its assessment of the likely quality of three-dimensionally filtering the current signal on comparisons between the inter-frame luma and multiple intra-frame luma signals (or the filtered versions thereof). For example, method step 960 may determine respective amounts of difference between the filtered inter-frame luma signal and the filtered intra-frame luma signals. The method step 960 may then compare the respective amounts of difference to a threshold (or respective thresholds) to determine whether three-dimensionally comb filtering the current signal will likely yield a high quality result and therefore be appropriate. The method step 960 may, for example, require one or both of the respective amounts of difference to be below a threshold (or respective thresholds) for the method step 960 to determine that three-dimensional comb filtering the current signal will likely yield a high quality result.

Figure 10:
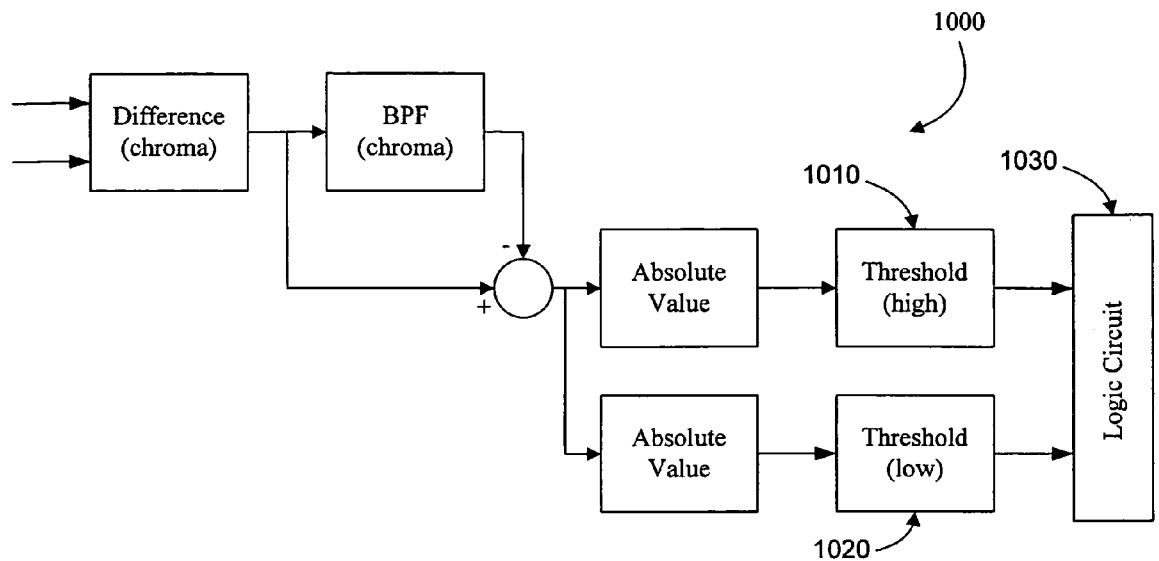
FIG. 10 is a diagram illustrating a system for analyzing crosstalk in a chroma signal in accordance with various aspects of the present invention.

FIG. 10 is a diagram illustrating a system 1000 for analyzing crosstalk in a chroma (or luma-cancelled) signal in accordance with various aspects of the present invention. The system 100 is similar to the system 500 illustrated in FIG. 5. Accordingly, the following discussion will focus on the differences between the two exemplary systems. The system 1000 of FIG. 10 may, for example, be utilized to implement steps 910 and 930 of the method 900 illustrated in FIG. 9. For example, the system 1000 includes a first comparator circuit 1010 that may compare the magnitude of the filtered chroma signal to a first threshold. The first threshold may, for example, be analogous to the maximum acceptable threshold discussed in the FIG. 9 discussion regarding step 910. The system 1000 also includes a second comparator circuit 1020 that may compare the magnitude of the filtered chroma signal to a second threshold. This second threshold may correspond, for example, to the second threshold discussed in the FIG. 9 discussion regarding step 930. The first 1010 and second 1020 comparator circuits may output signal indicative of their respective comparisons to subsequent signal processing circuitry, such as the logic circuit 1030, for further processing.

Figure 11:
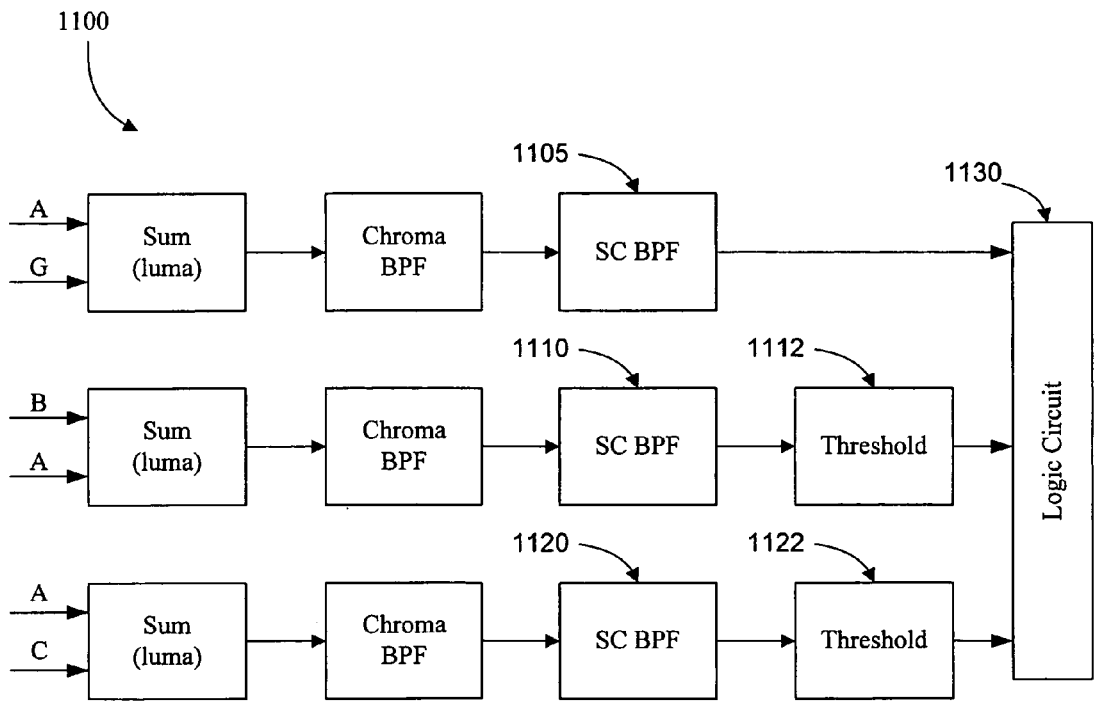
FIG. 11 is a diagram illustrating a system for analyzing crosstalk in frame-combed and line-combed luma signals in accordance with various aspects of the present invention.

FIG. 11 is a diagram illustrating a system 1100 for analyzing crosstalk in frame-combed and line-combed luma (cancelled-chroma) signals in accordance with various aspects of the present invention. The system 1 100 is similar in various aspects to the system 700 illustrated in FIG. 7. Accordingly, the following discussion will focus on the differences between the two exemplary systems. In the FIG. 11 system 1100, the first narrow-band-filtered intra-frame luma signal output from the second narrow-band-pass filter 1110 is coupled to a second comparator circuit 1112, which compares the first narrow-band-filtered intra-frame luma signal to a first threshold. Similarly, the second narrow-band-filtered intra-frame luma signal output from the third narrow-band-pass filter 1120 is coupled to a third comparator circuit 1122, which compares the second narrow-band-filtered intra-frame luma signal to a second threshold.

Subsequent logic circuitry 1130 may then analyze the signals output from various components of the system 1100 to determine an expected quality of the current signal processed using three-dimensional comb filtering. For example, if the narrow-band-filtered inter-frame luma signal output from the first narrow-band-pass filter 1105 is below a threshold, then the subsequent logic circuitry 1130 may determine that the expected quality of three-dimensionally filtering the current signal is high enough to warrant performing three-dimensional comb filtering on the current signal.

Also, for example, if the narrow-band-filtered inter-frame luma signal output from the first narrow-band-pass filter 1105 is above a threshold, then the subsequent logic circuitry 1130 may determine the expected quality of three-dimensionally filtering the current signal based on the indications output from the second 1112 and third 1122 comparator circuits. For example, the subsequent logic circuitry 1130 may, in this case, require that at least one of (or both of) the narrow-band-pass filtered intra-frame luma signals output from the narrow-band-pass filters 1110, 1120 be above a threshold (or respective thresholds) for the subsequent logic circuitry 1130 to determine that three-dimensional filtering the current signal is appropriate.

Various aspects of the present invention, as previously described, may be performed using systems and system components that include hardware components, software components, and a variety of combinations thereof. Accordingly, the scope of various aspects of the present invention should, by no means, be limited to particular hardware and software implementations.

In summary, various aspects of the present invention provide a system and method for utilizing three-dimensional comb filtering in a signal processing system.

While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for indicating whether to process a current signal using three-dimensional comb filtering, the current signal corresponding to a signal in a current video line of a current video field of a current video frame, the current signal having a luma component, a chroma component, a chroma frequency band and a chroma sub-carrier frequency, the method comprising:
  generating an inter-frame luma signal;
  generating a filtered inter-frame luma signal by signal processing, comprising substantially removing at least one frequency component from the inter-frame luma signal; and
  if the magnitude of the filtered inter-frame luma signal is less than a first threshold, then generating a signal indicating that three-dimensional comb filtering the current signal is appropriate; and
  if the magnitude of the filtered inter-frame luma signal is not less than the first threshold, then:
    generating a first intra-frame luma signal;
    determining, based on at least the frequency content of the first intra-frame luma signal, whether processing the current signal using three-dimensional comb filtering is appropriate; and
    generating a signal indicating whether processing the current signal using three-dimensional comb filtering is appropriate.

2. The method of claim 1, wherein generating an inter-frame luma signal comprises adding the current signal and a signal from a different video frame that spatially corresponds to the current signal.

3. The method of claim 1, wherein generating a filtered inter-frame luma signal comprises substantially removing frequency components from the inter-frame luma signal that are not within at least one portion of the chroma frequency band.

4. The method of claim 1, wherein determining whether processing the current signal using three-dimensional comb filtering is appropriate comprises:
  generating a first filtered intra-frame luma signal by signal processing, comprising substantially removing at least one frequency component from the first intra-frame luma signal; and
  if the magnitude of the first filtered intra-frame luma signal is greater than a second threshold, then determining that three-dimensional comb filtering the current signal is appropriate.

5. The method of claim 1, wherein determining whether processing the current signal using three-dimensional comb filtering is appropriate comprises:
  generating a first filtered intra-frame luma signal by signal processing, comprising substantially removing at least one frequency component from the first intra-frame luma signal;
  determining a difference between the first filtered intra-frame luma signal and the filtered inter-frame luma signal; and
  if the difference between the first filtered intra-frame luma signal and the filtered inter-frame luma signal is less than a second threshold, then determining that three-dimensional comb filtering the current signal is appropriate.

6. The method of claim 4, further comprising, if the magnitude of the filtered inter-frame luma signal is not less than the first threshold, then:
  generating a second intra-frame luma signal; and
  determining, based on at least the frequency content of the second intra-frame luma signal, whether processing the current signal using three-dimensional comb filtering is appropriate.

7. The method of claim 1, further comprising:
  generating an inter-frame chroma signal;
  generating a filtered inter-frame chroma signal by signal processing, comprising substantially removing at least one frequency component from the inter-frame chroma signal; and
  if the magnitude of the filtered inter-frame chroma signal is greater than a second threshold, then generating a signal indicating that three-dimensional comb filtering the current signal is not appropriate.

8. A method for indicating whether to process a current signal using three-dimensional comb filtering, the current signal corresponding to a signal in a current video line of a current video field of a current video frame, the current signal having a luma component, a chroma component, a chroma frequency band and a chroma sub-carrier frequency, the method comprising:
  generating an inter-frame chroma signal;
  generating a filtered inter-frame chroma signal by signal processing, comprising substantially removing at least one frequency component from the inter-frame chroma signal;
  if the magnitude of the filtered inter-frame chroma signal is greater than a first threshold, then generating a signal indicating that three-dimensional comb filtering the current signal is not appropriate;
  if the magnitude of the filtered inter-frame chroma signal is less than a second threshold, the second threshold being less than the first threshold, then generating a signal indicating that three-dimensional comb filtering the current signal is appropriate.

9. The method of claim 8, wherein generating an inter-frame chroma signal comprises subtracting one of the current signal and a signal from a different video frame that spatially corresponds to the current signal from the other.

10. The method of claim 8, wherein generating a filtered inter-frame chroma signal comprises substantially removing frequency components from the inter-frame chroma signal that correspond generally to the chroma frequency band.

11. The method of claim 8, further comprising, if the magnitude of the filtered inter-frame chroma signal is not greater than the first threshold and is not less than the second threshold, then:
  generating an inter-frame luma signal;
  generating a filtered inter-frame luma signal by signal processing, comprising substantially removing at least one frequency component from the inter-frame luma signal; and
  if the magnitude of the filtered inter-frame luma signal is less than a third threshold, then generating a signal indicating that three-dimensional comb filtering the current signal is appropriate.

12. The method of claim 11, wherein generating an inter-frame luma signal comprises adding the current signal and a signal from a different video frame that spatially corresponds to the current signal.

13. The method of claim 11, wherein generating a filtered inter-frame luma signal comprises substantially removing frequency components from the inter-frame luma signal that are not within a portion of the chroma frequency band.

14. The method of claim 11, further comprising, if the magnitude of the filtered inter-frame luma signal is not less than the third threshold, then:

generating an intra-frame luma signal;
generating a filtered intra-frame luma signal by signal processing, comprising substantially removing at least one frequency component from the intra-frame luma signal; and
if the magnitude of the filtered intra-frame luma signal is greater than a fourth threshold, then generating a signal indicating that three-dimensional comb filtering the current signal is appropriate.

15. The method of claim 11, further comprising, if the magnitude of the filtered inter-frame luma signal is not less than the third threshold, then:
generating an intra-frame luma signal;
generating a filtered intra-frame luma signal by signal processing, comprising substantially removing at least one frequency component from the intra-frame luma signal;
determining a difference between the filtered intra-frame luma signal and the filtered inter-frame luma signal; and
if the difference between the filtered intra-frame luma signal and the filtered inter-frame luma signal is less than a fourth threshold, then generating a signal indicating that three-dimensional comb filtering the current signal is appropriate.

16. A system for indicating whether to process a current signal using three-dimensional comb filtering, the current signal corresponding to a signal in a current video line of a current video field of a current video frame, the current signal having a luma component, a chroma component, a chroma frequency band and a chroma sub-carrier frequency, the system comprising:
a first circuit that generates an inter-frame luma signal;
a first filter circuit communicatively coupled to the first circuit that receives the inter-frame luma signal and generates a filtered inter-frame luma signal by performing signal processing that comprises substantially removing at least one frequency component from the inter-frame luma signal; and
a first comparator circuit communicatively coupled to the first filter circuit that receives the filtered inter-frame luma signal, compares the filtered inter-frame luma signal to a first threshold, and outputs an indication of the comparison between the filtered inter-frame luma signal and the first threshold;
a second circuit that generates a first intra-frame luma signal; and
a first logic circuit communicatively coupled to the first comparator circuit and the second circuit that receives the indication of comparison between the filtered inter-frame luma signal and the first threshold and receives the first intra-frame luma signal, and outputs a signal indicative of whether processing the current signal using three-dimensional comb filtering is appropriate based on at least one of:
the indication of the comparison between the filtered inter-frame luma signal and the first threshold; and
frequency content of the first intra-frame luma signal.

17. The system of claim 16, wherein the first circuit receives as input the current signal and a signal from a different video frame that spatially corresponds to the current signal, and generates the inter-frame luma signal by performing signal processing that comprises summing the current signal and the signal from the different video frame.

18. The system of claim 16, wherein the first filter circuit generates the filtered inter-frame luma signal by performing signal processing that comprises substantially removing frequency components from the inter-frame luma signal that are not within a portion of the chroma frequency band.

19. The system of claim 16, wherein the first logic circuit comprises:
a second filter circuit communicatively coupled to the second summing circuit that receives the first intra-frame luma signal and generates a first filtered intra-frame luma signal by performing signal processing that comprises substantially removing at least one frequency component from the first intra-frame luma signal; and
a second comparator circuit communicatively coupled to the second filter circuit that receives the first filtered intra-frame luma signal, compares the first filtered intra-frame luma signal to a second threshold, and outputs an indication of the comparison between the first filtered intra-frame luma signal and the second threshold.

20. The system of claim 19, wherein the first logic circuit further comprises a first logic sub-circuit coupled to the first comparator circuit and the second comparator circuit that outputs a signal indicative of whether to process the current signal using three-dimensional comb filtering, based on at least one of:
the indication of the comparison between the filtered inter-frame luma signal and the first threshold; and
the indication of the comparison between the first filtered intra-frame luma signal and the second threshold.

21. The system of claim 16, wherein the first logic circuit comprises:
a second filter circuit communicatively coupled to the second circuit that receives the first intra-frame luma signal and generates a first filtered intra-frame luma signal by signal processing that comprises substantially removing at least one frequency component from the first intra-frame luma signal; and
a second comparator circuit communicatively coupled to the first filter circuit and the second filter circuit that receives the filtered inter-frame luma signal and the first filtered intra-frame luma signal, compares the filtered inter-frame luma signal to the first filtered intra-frame luma signal, and outputs an indication of difference between the filtered inter-frame luma signal and the first filtered intra-frame luma signal.

22. The system of claim 21, further comprising a third comparator circuit communicatively coupled to the second comparator circuit that compares the indication of difference to a second threshold and outputs a signal indicative of whether processing the current signal using three-dimensional comb filtering is appropriate based on the comparison between the indication of difference and the second threshold.

23. The system of claim 19, further comprising:
a third circuit that generates a second intra-frame luma signal;
a third filter circuit communicatively coupled to the third circuit that receives the second intra-frame luma signal and generates a second filtered intra-frame luma signal by signal processing that comprises substantially removing at least one frequency component from the second intra-frame luma signal;
a third comparator circuit communicatively coupled to the third filter circuit that receives the second filtered intra-frame luma signal, compares the second filtered intra-frame luma signal to a third threshold, and outputs an indication of the comparison between the second filtered intra-frame luma signal and the third threshold; and a first logic sub-circuit coupled to the first comparator circuit, second comparator circuit and third comparator circuit that outputs a signal indicative of whether to process the current signal using three-dimensional comb filtering, based on at least one of:
the indication of the comparison between the filtered inter-frame luma signal and the first threshold;
the indication of the comparison between the first filtered intra-frame luma signal and the second threshold; and
the indication of the comparison between the second filtered intra-frame luma signal and the third threshold.

24. The system of claim 16, further comprising:
a third circuit that generates a chroma signal;
a second filter circuit communicatively coupled to the third circuit that receives the chroma signal and generates a filtered chroma signal by signal processing that comprises substantially removing at least one frequency component from the chroma signal; and
a second comparator circuit communicatively coupled to the second filter circuit that receives the filtered chroma signal, compares the filtered chroma signal to a second threshold, and outputs an indication of the comparison between the filtered chroma signal and the second threshold.

25. The system of claim 24, further comprising a second logic circuit communicatively coupled to the second comparator circuit that receives the indication of comparison between the filtered chroma signal and the second threshold, and outputs a signal indicative of whether to process the current signal using three-dimensional comb filtering, based on the comparison between the filtered chroma signal and the second threshold.

26. A system for indicating whether to process a current signal using three-dimensional comb filtering, the current signal corresponding to a signal in a current video line of a current video field of a current video frame, the current signal having a luma component, a chroma component, a chroma frequency band and a chroma sub-carrier frequency, the system comprising:
a first circuit that generates a chroma signal;
a filter circuit communicatively coupled to the first circuit that receives the chroma signal and generates a filtered chroma signal by signal processing that comprises substantially removing at least one frequency component from the chroma signal;
a first comparator circuit communicatively coupled to the filter circuit that receives the filtered chroma signal, compares the filtered chroma signal to a first threshold, and outputs an indication of the comparison between the filtered chroma signal and the first threshold; and
a second comparator circuit communicatively coupled to the filter circuit that receives the filtered chroma signal, compares the filtered chroma signal to a second threshold that is less than the first threshold, and outputs an indication of the comparison between the filtered chroma signal and the second threshold.

27. The system of claim 26, wherein the first circuit receives as input the current signal and a signal from a different video frame that spatially corresponds to the current signal, and generates the chroma signal by performing signal processing that comprises calculating a difference between the current signal and the signal from the different video frame.

28. The system of claim 26, wherein the first filter circuit generates the filtered chroma signal by performing signal processing that comprises substantially removing frequency components from the chroma signal that correspond generally to the chroma frequency band.

29. The system of claim 26, further comprising a logic circuit coupled to the first comparator circuit and the second comparator circuit that outputs a signal indicative of a determination not to process the current signal using three-dimensional comb filtering when the filtered chroma signal is greater than the first threshold and outputs a signal indicative of a determination to process the current signal using three-dimensional comb filtering when the filtered chroma signal is less than the second threshold.

30. The system of claim 26, further comprising:
a second circuit that generates an inter-frame luma signal;
a second filter circuit communicatively coupled to the second circuit that receives the inter-frame luma signal and generates a filtered inter-frame luma signal by performing signal processing that comprises substantially removing at least one frequency component from the inter-frame luma signal; and
a third comparator circuit communicatively coupled to the second filter circuit that receives the filtered inter-frame luma signal, compares the filtered inter-frame luma signal to a third threshold, and outputs an indication of the comparison between the filtered inter-frame luma signal and the third threshold.

31. The system of claim 30, wherein the second circuit receives as input the current signal and the signal from the different video frame that spatially corresponds to the current signal and generates the inter-frame luma signal by performing signal processing that comprises summing the current signal and the signal from the different video frame.

32. The system of claim 30, wherein the second filter circuit generates the filtered inter-frame luma signal by performing signal processing that comprises substantially removing frequency components from the inter-frame luma signal that are not within a portion of the chroma frequency band.

33. The system of claim 30, further comprising:
a third circuit that generates a first intra-frame luma signal;
a third filter circuit communicatively coupled to the third circuit that receives the first intra-frame luma signal and generates a first filtered intra-frame luma signal by signal processing that comprises substantially removing at least one frequency component from the first intra-frame luma signal; and
a fourth comparator circuit communicatively coupled to the third filter circuit that receives the first filtered intra-frame luma signal, compares the first filtered intra-frame luma signal to a fourth threshold, and outputs an indication of the comparison between the first filtered intra-frame luma signal and the fourth threshold.

34. The system of claim 30, further comprising:
a third circuit that generates a first intra-frame luma signal;
a third filter circuit communicatively coupled to the third circuit that receives the first intra-frame luma signal and generates a first filtered intra-frame luma signal by signal processing that comprises substantially removing at least one frequency component from the first intra-frame luma signal; and a fourth comparator circuit communicatively coupled to the second filter circuit and the third filter circuit that receives the filtered inter-frame luma signal and the first filtered intra-frame luma signal, compares the filtered inter-frame luma signal and the first filtered intra-frame luma signal, and outputs an indication of the comparison between the filtered inter-frame luma signal and the first filtered intra-frame luma signal.

35. The system of claim 34, further comprising a fifth comparator circuit communicatively coupled to the fourth comparator circuit that compares the indication of the comparison output from the fourth comparator circuit to a fourth threshold, and outputs an indication of comparison between the indication of comparison output from the fourth comparator circuit and the fourth threshold.

* * * * *